United States Patent [19]
Kvisle et al.

[11] Patent Number: 5,663,471
[45] Date of Patent: Sep. 2, 1997

[54] PROCEDURE FOR SYNTHESIS OF CRYSTALLINE MICROPOROUS SILICO-ALUMINO-PHOSPHATES

[75] Inventors: Steinar Kvisle, Porsgrunn; Rune Wendelbo, Oslo; Hanne Øren, Billingstad, all of Norway

[73] Assignee: Norsk Hydro a.s., Oslo, Norway

[21] Appl. No.: 256,069

[22] PCT Filed: Dec. 9, 1992

[86] PCT No.: PCT/NO92/00193

§ 371 Date: Aug. 25, 1994

§ 102(e) Date: Aug. 25, 1994

[87] PCT Pub. No.: WO93/13013

PCT Pub. Date: Jul. 8, 1993

[30] Foreign Application Priority Data

Dec. 23, 1991 [NO] Norway ................................ 915080

[51] Int. Cl.$^6$ .......................... C07C 1/00; C01B 37/08; C01B 39/00
[52] U.S. Cl. .......................... 585/639; 423/700; 423/702; 423/704; 423/705; 423/718; 423/DIG. 30
[58] Field of Search .......................... 585/639; 423/705, 423/700, 702, 704, 718, DIG. 30

[56] References Cited

U.S. PATENT DOCUMENTS

| | | | |
|---|---|---|---|
| 4,673,559 | 6/1987 | Derouane et al. | 423/705 |
| 4,677,242 | 6/1987 | Kaiser | 585/639 |
| 5,096,684 | 3/1992 | Guth et al. | 423/705 |
| 5,158,665 | 10/1992 | Miller | 423/705 |
| 5,475,182 | 12/1995 | Janssen | 585/639 |

*Primary Examiner*—Wayne Langel
*Attorney, Agent, or Firm*—Wenderoth, Lind & Ponack

[57] ABSTRACT

A process for producing crystalline microporous silico-alumino-phosphates with controlled Si content from a mixture of reactive sources of $SiO_2$, $Al_2O_3$ and $P_2O_5$ and an organic template material, by combining at least a portion of the Al source and the P source in the absence of the Si source, mixing the resulting mixture with any remaining Al source, the Si source and the organic template material to obtain a gel, and heating the gel to obtain crystallization, wherein the Al and Si sources in the reaction mixture are mixed in the same mole ratios as in the crystalline microporous silica-alumino-phosphate to be produced, the P source is added in stoichiometric excess and hydrochloric acid is added at the same time as the P source, in a quantity such that the ratio of silica to hydrochloric acid in the gel is kept between 0.3 and 3. The invention also provides a crystalline microporous silico-alumino-phosphate produced by the process, and the use of such silico-alumino-phosphate as a catalyst for producing olefins from methanol.

9 Claims, No Drawings

PROCEDURE FOR SYNTHESIS OF CRYSTALLINE MICROPOROUS SILICO-ALUMINO-PHOSPHATES

The application concerns a procedure for the production of crystalline microporous silico-alumino-phosphates with a controlled silicon content, a crystalline microporous silico—alumino-phosphate with improved stability to deactivation and an application of this in the production of olefins from methanol.

We are familiar from Norwegian Patent Application No. 832712 with microporous crystalline silico-alumino-phosphates and a procedure for synthesizing such products. These products have a three-dimensional space lattice built up from $PO_2+$, $AlO_2-$ and $SiO_2$ tetrahedral units, whose most important chemical composition on a water-free basis is:

$$mR:(Si_xAl_yP_z)O_2$$

where "R" represents at least one organic template material which is present in the intracrystalline pore system; "m" is the number of moles of "R" present per mole of $(Si_xAl_yP_z)O_2$ and m has a value between 0 and 0.3, the maximum value in each case being dependent on the molecular dimensions of the template material and the available pore volume in the silico-alumino- phosphate structure in question; "x", "y" and "z" are molar fractions of silicon, aluminium and phosphorus respectively, present as tetrahedral oxides. The minimum value of "x", "y" and "z" is 0.01, and the maximum value of "x" is 0.98, of "y" 0.6 and of "z" 0.52. The minimum value of "m" in the formula above is 0.02.

The reaction mixture is achieved by combining at least one part each of the aluminium and phosphorus sources in the absence of the silicon source. Then the resultant mixture is reacted with the remaining components to get the total reaction mixture.

The reaction mixture is placed in a pressure vessel for shaking then heating under autogenic pressure to a temperature of at least 100° C., and preferably between 100° and 260° C., until a crystalline silico-alumino-phosphate is obtained. The product is extracted in any appropriate way, for example by centrifuging or filtering.

It is generally known that the chemical composition of the silico-alumino-phosphates is very important for their physical and chemical properties, including their properties when used as catalytic materials. It would therefore be a great advantage if one could use production methods for silico-alumino-phosphates where the chemical composition of the product can be variably controlled. This is particularly true of the silicon content. The known technique makes no allowance for this. In syntheses of SAPO-34 in NO 832712, for example, there is a poor match between the chemical composition of the synthesis gel and the synthesized silico-alumino-phosphate.

According to the examples in NO 832712, equimolar quantities of aluminium oxide and phosphorus pentoxide are used to synthesize SAPO-34. Since Si partly replaces P in the SAPO structure, a mixture is obtained where an excess of P has arisen in the form of phosphoric acid. The amount of Si which replaces P, and thus the composition of the end product, does not seem to be controllable in these syntheses.

After a period of time, all catalysts used to convert methanol to olefin (the MTO reaction) lose their active ability to convert methanol to hydrocarbons—that is, the catalyst is deactivated. With MTO catalysts of the molecular sieve type, this is because the microporous crystal structure is filled up with low-volatility carboniferous compounds which block the pore structure. This is often called deactivation by "coking". The carboniferous compounds can be removed by combustion in air. This is a familiar technique.

Deactivation can also take the form of the collapse of the space lattice, but this kind of deactivation takes place over a much longer timescale than deactivation by coking.

Stability to deactivation by coking is a very important property for an MTO catalyst, so it would be a great advantage if one could produce MTO catalysts with improved stability to deactivation by coking.

The object of the invention is thus to produce crystalline microporous silico-alumino-phosphates with controlled silicon content. Another object is to produce silico-alumino-phosphates which have an enhanced stability to deactivation by coking.

These and other objects of the invention are achieved by means of the procedure described below, and the invention is characterized and defined by the patent claims listed at the end of this application.

With this invention we have arrived at a method by which the chemical composition of the product can be controlled. Surprisingly, we have found that this can be done by mixing the aluminium, silicon and phosphorus sources in the synthesis gel in the same proportions as required in the finished silico-alumino-phosphate. To achieve this it is necessary to have a small excess of phosphoric acid corresponding to the amount remaining in the fluid phase after complete crystallization. Furthermore, another acid than phosphoric acid must be added. We have preferred to use hydrochloric acid. The composition of the end product can be accurately controlled, and as a result, silico-alumino-phosphates can be synthesized with the desired silicon content. This can in general be used to optimize the chemical properties of silico-alumino-phosphates used as catalysts.

To synthesize silico-alumino-phosphates according to the invention, the aluminium source is mixed with the phosphorus source and the acid additive. The mixture is homogenized before the silica source is added. The gel formed is homogenized before adding the template material. After homogenization, the mixture is poured into a pressure vessel and shaken at room temperature, then heated. The solid reaction product is recovered and dried.

The sequence of the process stages is not critical, but the extra acid additive (preferably HCl) must be added along with the phosphorus source. It was found that the molar ratio of silica to HCl must be kept between 0.3 and 3. The preferred ratio is 1–2.

In synthesizing silico-alumino-phosphates, the choice of sources for aluminium oxide, silica and phosphorus pentoxide is not critical. For example, aluminium propoxide, phosphoric acid and silica sol can be used. As template materials, tetraethyl ammonium hydroxide solution, cyclopentylamine, aminomethyl cyclohexane, piperidine, cyclohexylamine and tri-ethyl hydroxyethylamine can be mentioned as suitable materials.

The invention will be further illustrated by the following examples. In the examples the improved method of synthesis is used to produce the material SAPO-34 in particular, but can be generally used to synthesize all types of silico-alumino-phosphates.

EXAMPLE 1

To synthesize SAPO-34, a reaction mixture was made by combining 27.2 g of aluminium isopropoxide with a mixture of 13.7 g of 85% phosphoric acid and 1.4 g of 37% hydrochloric acid in 36.3 g of distilled water. The mixture was homogenized by agitation for one minute in a 250 ml PE bottle. To this mixture was added 4.0 g of a 30% silica sol in water, and the gel which formed was homogenized in the same way as described above. The mixture was left to stand for five minutes. Then 49.2 g 40% of an aqueous solution of tetraethyl ammonium hydroxide was added, and this mixture was homogenized as described above. The composition of the finished reaction mixture in mole ratios was:

(TEA)$_2$O: 0.30SiO$_2$: Al$_2$O$_3$: 0.89P$_2$O$_5$: 0.20HCl

The mixture was then poured into a stainless steel pressure vessel lined with an inert material, and this was placed in a heat block. The heat block and pressure vessel were agitated on a vibration table for 16 hours at room temperature. The mixture was then heated to 215° C., and was kept at this temperature for 99 hours. The solid reaction product was recovered by centrifuging, washed in 150 ml of distilled water and then centrifuged again. It was then dried in air at 110° C. overnight. The product was crystalline, and consisted of SAPO-34 with an X-ray powder diffraction pattern (XRD) characterized by the following data:

TABLE 1

| 2θ | d | 100 × I/I$_o$ |
|---|---|---|
| 9.49 | 9.32 | 100 |
| 12.80 | 6.92 | 15 |
| 14.07 | 6.29 | 16 |
| 15.98 | 5.55 | 49 |
| 20.54 | 4.33 | 74 |
| 22.27 | 3.991 | 5 |
| 23.06 | 3.857 | 5 |
| 25.26 | 3.526 | 19 |
| 25.80 | 3.453 | 15 |
| 27.57 | 3.236 | 4 |
| 28.42 | 3.140 | 3 |
| 29.52 | 3.026 | 5 |
| 30.51 | 2.930 | 25 |
| 31.28 | 2.866 | 17 |

The product was calcinated in dry air at 600° C. for two hours, and then analysed. Chemical analysis determined that the composition of the solid, calcinated product was 42.4 weight % Al$_2$O$_3$, 8.1 weight % SiO$_2$, 49.5 weight % P$_2$O$_5$, which gave a product composition in terms of the main components of 0.32SiO$_2$: Al$_2$O$_3$: 0.84P$_2$O$_5$.

EXAMPLE 2

SAPO-34 was synthesized with the same prescription as described in Example 1, but the amount of silica sol added was less (3.2 g); less hydrochloric acid was added (1.1 g); but, more phosphoric acid (14.2 g), such that the composition of the finished reaction mixture in mole ratios was:

(TEA)$_2$O: 0.24SiO$_2$: Al$_2$O$_3$: 0.92P$_2$O$_5$: 0.16HCl

The product was recovered as described in Example 1 and was characterized by an XRD pattern without significant deviations from the one shown in Table 1. Chemical analysis of the calcinated product revealed a product composition in terms of main components of:

0.25SiO$_2$: Al$_2$O$_3$: 0.92P$_2$O$_5$.

EXAMPLE 3

SAPO-34 was synthesized with the same prescription as described in Example 1, but the quantity of silica sol added was less (2.6 g); less hydrochloric acid was added (0.9 g), but more phosphoric acid (14.5 g) such that the composition of the finished reaction mixture in mole ratios was:

(TEA)$_2$O: 0.20SiO$_2$: Al$_2$O$_3$: 0.94P$_2$O$_5$: 0.12HCl

The product was recovered as described in Example 1 and characterized by an XRD pattern in all essentials as in Table 1.

Chemical analysis of the calcinated product revealed a product composition in terms of main components of:

0.21SiO$_2$: Al$_2$O$_3$: 0.94P$_2$O$_5$.

EXAMPLE 4

SAPO-34 was synthesized with the same prescription as described in Example 1, but the quantity of silica sol added was less (2.0 g); less hydrochloric acid was added (0.7 g); but more phosphoric acid (14.9 g), such that the composition of the finished reaction mixture in mole ratios was:

(TEA)$_2$O: 0.15 SiO$_2$: Al$_2$O$_3$: 0.97P$_2$O$_5$: 0.10HCl

The product was recovered as described in Example 1 and characterized by an XRD pattern in all essentials as in Table 1.

Chemical analysis of the calcinated product revealed a Product composition in terms of main components of:

0.17SiO$_2$: Al$_2$O$_3$:P$_2$O$_5$.

EXAMPLE 5

SAPO-34 was synthesized with the same prescription as described in Example 1, but the quantity of silica sol added was greater (8.2 g); more hydrochloric acid was added (3.2 g); but less phosphoric acid (11.0 g) such that the composition of the finished reaction mixture in mole ratios was:

(TEA)$_2$O: 0.62SiO$_2$: Al$_2$O$_3$: 0.72P$_2$O$_5$: 0.48HCl

The product was recovered as described in Example 1 and characterized by an XRD pattern in all essentials as in Table 1. Chemical analysis of the calcinated product revealed a product composition in terms of main components of:

0.59SiO$_2$: Al$_2$O$_3$: 0.83P$_2$O$_5$.

EXAMPLE 6

SAPO-34 was synthesized with the same prescription as described in Example 1, but the quantity of silica sol added was less (1.5 g); less hydrochloric acid was added (1.1 g); but more phosphoric acid (15.0 g), such that the composition of the finished reaction mixture in mole ratios was:

(TEA)$_2$O: 0.11SiO$_2$: Al$_2$O$_3$: 0.97P$_2$O$_5$: 0.15HCl

The product was recovered as described in Example 1 and characterized by an XRD pattern in all essentials as in Table 1.

Table 2 sums up the molar composition of the synthesis gel and the synthesized silico-alumino-phosphates in Examples 1–6.

TABLE 2

Molar composition of synthesis mixture and products in Examples 1–6.

| Example # | SYNTHESIS GEL | | | SYNTHESIS PRODUCT | | |
|---|---|---|---|---|---|---|
| | SiO$_2$ | Al$_2$O$_3$ | P$_2$O$_5$ | SiO$_2$ | Al$_2$O$_3$ | P$_2$O$_5$ |
| 1 | 0.30 | 1.00 | 0.89 | 0.32 | 1.00 | 0.84 |
| 2 | 0.24 | 1.00 | 0.92 | 0.25 | 1.00 | 0.92 |
| 3 | 0.20 | 1.00 | 0.94 | 0.21 | 1.00 | 0.94 |
| 4 | 0.15 | 1.00 | 0.97 | 0.17 | 1.00 | 1.00 |
| 5 | 0.60 | 1.00 | 0.75 | 0.59 | 1.00 | 0.83 |
| 6 | 0.11 | 1.00 | 0.97 | 0.09 | 1.00 | 0.96 |

The results in Table 2 illustrate how the enhanced method of synthesis can be used to control the variation of the silicon content in SAPO-34.

The synthesis examples are described with the addition of hydrochloric acid to regulate the PH of the gel. Tests were done to establish whether the addition of other acids produced the intended effect. Examples 7 and 8 describe the use of sulphuric and nitric acid respectively instead of hydrochloric acid.

EXAMPLE 7

SAPO-34 was synthesized with the same prescription as described in Example 6, but instead of 1.1 g of 37% hydrochloric acid, 0.7 g of concentrated sulphuric acid was added, such that the composition of the finished reaction mixture in mole ratios was:

$(TEA)_2O$: $0.11SiO_2$: $Al_2O_3$: $0.97P_2O_5$: $0.05H_2SO_4$

The product was recovered as described in Example 1 and characterized by an XRD pattern with the following data:

TABLE 3

| 2θ | d | 100 × I/I₀ |
|---|---|---|
| 7.44 | 11.9 | 100 |
| 9.49 | 9.31 | 29 |
| 12.90 | 6.86 | 12 |
| 14.08 | 6.29 | 5 |
| 14.96 | 5.92 | 21 |
| 15.98 | 5.54 | 13 |
| 19.83 | 4.47 | 40 |
| 20.53 | 4.32 | 25 |
| 21.08 | 4.21 | 42 |
| 21.50 | 4.13 | 10 |
| 22.48 | 3.955 | 55 |
| 23.10 | 3.850 | 4 |
| 24.85 | 3.583 | 5 |
| 25.30 | 3.521 | 8 |
| 26.06 | 3.419 | 16 |
| 27.68 | 3.222 | 2 |
| 28.32 | 3.151 | 4 |
| 29.15 | 3.063 | 10 |
| 30.18 | 2.962 | 13 |
| 30.50 | 2.930 | 9 |
| 31.32 | 2.856 | 7 |
| 33.79 | 2.653 | 4 |

The X-ray data in Table 3 shows that the product mainly consists of SAPO-5 with some SAPO-34.

EXAMPLE 8

SAPO-34 was synthesized with the same prescription as described in Example 6, but instead of 1.1 g of 37% hydrochloric acid, 1.0 g of 65% nitric acid was added, such that the composition of the finished reaction mixture in mole ratios was:

$(TEA)_2O$: $0.11SiO_2$: $Al_2O_3$: $0.97P_5$: $0.07HNO_3$

The product was recovered as described in Example 1 and characterized by an XRD pattern with the following data:

TABLE 4

| 2θ | d | 100 × I/I₀ |
|---|---|---|
| 7.45 | 11.9 | 36 |
| 9.51 | 9.29 | 100 |
| 10.80 | 8.19 | 5 |
| 12.82 | 6.90 | 11 |
| 14.07 | 6.29 | 12 |
| 14.92 | 5.94 | 10 |
| 15.53 | 5.70 | 15 |
| 15.97 | 5.55 | 29 |
| 16.97 | 5.22 | 25 |
| 19.87 | 4.47 | 15 |
| 20.53 | 4.32 | 42 |
| 20.99 | 4.23 | 28 |
| 22.46 | 3.959 | 16 |
| 24.38 | 3.650 | 5 |

TABLE 4-continued

| 2θ | d | 100 × I/I₀ |
|---|---|---|
| 25.33 | 3.516 | 14 |
| 25.81 | 3.452 | 12 |
| 26.14 | 3.409 | 11 |
| 26.79 | 3.328 | 6 |
| 29.13 | 3.065 | 5 |
| 30.16 | 2.963 | 11 |
| 30.51 | 2.930 | 16 |
| 31.32 | 2.856 | 17 |

The XRD data in Table 4 show that the product mainly consists of SAPO-34, but with a considerable percentage of SAPO-5.

The characterization of the products in Examples 7 and 8 by their powder X-ray diffractogram shows that impurities were obtained. This indicates that hydrochloric acid is the preferred reagent for synthesizing a product with controlled composition.

It was found that the present invention provides optimum introduction and distribution of silicon in the crystal lattice of the silico-alumino-phosphates, and improved morphological properties. This was demonstrated by comparing silico-alumino-phosphates with the same silicon content, synthesized respectively with the present invention and with the known technique.

The examples show the catalytic application for the synthesis of light olefins from methanol as raw material. In general the improved silico-alumino-phosphates can be used for catalytic conversion of a raw material which includes aliphatic hetero-compounds like alcohols, ethers, carbonylic compounds like aldehydes and ketones, halogenides, mercaptans, sulphides and amines to a hydrocarbon product containing light olefins like ethylene, propylene and butenes. The aliphatic hetero-compound may be pure, in a mixture with others of the specified aliphatic hetero-compounds, or mixed with a diluent such as water, nitrogen, a hydrocarbon etc.

The raw material is brought into contact with the molecular sieve synthesized as in the invention in conditions which lead to efficient conversion into light olefins. Use of a diluent, especially water, is preferable in this reaction.

The process can be carried out in all the familiar reactor types, including fixed bed and fluidized reactors. The catalyst is prepared as necessary for use in the various reactor types. The techniques for such preparation are familiar and will not be described in this application.

The materials synthesized in Examples 1–6 were tested as catalysts in the conversion of methanol into light olefins (Exs. 9–14). All the materials were calcinated at a high temperature before testing to remove traces of template material in the microporous structure.

These tests were done in a steel reactor with an outside diameter of ½". 0.5 g of catalyst, screened to 35–70 US standard mesh, was used. Quartz particles were laid over and under the catalyst particles. The reactor was heated by an outside electric heater and the reactor temperature was measured with a thermo element. The reactor temperature in all examples described below was 425° C. Methanol was fed with a precision pump (ISCO LC 5000) and diluted with nitrogen gas, such that the partial pressure of methanol was 0.4 bars. Total pressure in the reactor was about 1.2 bars. The product gas from the reactor was conducted through a condenser cooled by ice water before the product composition was determined by gas chromatography.

The methanol conversion was 100% in the tests, with a carbon balance close to 100%. As a measure of the stability of the catalyst to deactivation, the interval before breakthrough of dimethyl ether was used. With the breakthrough of DME the conversion of oxygenates to light olefins is less than 100%, and the catalyst must be regenerated.

Table 5 shows the interval before breakthrough for the catalysts synthesized in Examples 1–6 above.

TABLE 5

Time before breakthrough of DME in MTO reaction for materials synthesized in Examples 1–6.

| Example # | Silicon content[1] | Breakthrough of DME (mins.) |
|---|---|---|
| 9 | 0.32 | 375 |
| 10 | 0.25 | 435 |
| 11 | 0.21 | 375 |
| 12 | 0.17 | 375 |
| 13 | 0.59 | 325 |
| 14 | 0.09 | 415 |

[1]Relative to $Al_2O_3$ (1.0)

The results in Table 5 indicate that the Si content is important for stability to deactivation by coking. The sample with the lowest Si content exhibited the greatest stability, while the sample with the highest Si content was poorest in this respect. Table 6 shows the product distribution in Example 10. Product distribution in the other examples is quite comparable.

TABLE 6

Product distribution (carbon selectivities at breakthrough of DME) in catalytic test of catalyst synthesized in Example 10.

| Methane | Ethene | Ethane | Propene | Propane | Butanes | Butenes | C5+ | CO | $CO_2$ |
|---|---|---|---|---|---|---|---|---|---|
| 1.6 | 43.9 | 1.0 | 42.0 | 0 | 0.1 | 9.8 | 1.1 | 0.2 | 0.3 |

EXAMPLE FOR COMPARISON

In order to compare this with the familiar technique, SAPO-34 was synthesized as in NO 832712 (Exs., 15–19). This method does not involve the use of HCl to control the silicon content of the synthesized SAPO-34. Five materials were synthesized with respective silicon contents of 0.14, 0.19, 0.23, 0.29 and 0.56, in other words samples with silicon contents comparable to those in Examples 1–5.

TABLE 7

Time before breakthrough of DME in MTO reaction for materials synthesized as in NO 832712.

| Example # | Silicon content[1] | Breakthrough of DME (mins.) |
|---|---|---|
| 15 | 0.14 | 295 |
| 16 | 0.19 | 325 |
| 17 | 0.23 | 325 |
| 18 | 0.29 | 325 |
| 19 | 0.56 | 325 |

[1]Relative to $Al_2O_3$

With the exception of the sample with a relative molar Si content of 0.14, the table shows that all the samples exhibited the same interval before breakthrough of DME. This interval was 325 mins. The sample with the lowest Si content took 295 mins. Comparing with Table 5, one sees that samples with comparable Si content, synthesized as in the present invention, exhibit better stability to deactivation than samples with the same Si content, synthesized by the familiar technique. This is evident from the fact that all the samples synthesized by the familiar technique exhibit a shorter interval before breakthrough of DME than samples synthesized in accordance with the present invention. This may be because the method described here provides a more favourable introduction of Si into the space lattice of the silico-alumino-phosphates and a better morphology, without this possible explanation implying any limitations on the invention.

We claim:

1. A process for producing a crystalline microporous silico-alumino-phosphate, namely SAPO-34 with controlled Si content from a mixture of reactive sources of $SiO_2$, $Al_2O_3$ and $P_2O_5$ and an organic template material, which comprises combining at least a portion of the Al source and the P source in the absence of the Si source, mixing the resulting mixture with any remaining Al source, the Si source and the organic template material to obtain a gel, and heating the gel to obtain crystallization, wherein the Al and Si sources in the reaction mixture are mixed in the same mole ratios as in the crystalline microporous produced SAPO-34 which is, the P source is added in stoichiometric excess and hydrochloric acid is mixed with and added at the same time as the P source, in a quantity such that the ratio of silica to hydrochloric acid in the gel is kept between 0.3 and 3.

2. A process according to claim 1, wherein the hydrochloric acid is added in a quantity such that the ratio of silica to hydrochloric acid in the gel is kept between 1 and 2.

3. A process according to claim 1, wherein the template material is tetraethyl ammonium hydroxide, cyclopentylamine, aminomethyl-cyclohexane, piperidine, cyclohexylamine or triethyl-hydroxyethylamine.

4. A process according to claim 1, wherein the excess of the P source is added corresponding to the amount remaining in the fluid phase after complete crystallization.

5. A crystalline microporous silico-alumino-phosphate, namely SAPO-34, with improved stability to deactivation by coking, which is produced from a mixture of reactive sources of $SiO_2$, $Al_2O_3$ and $P_2O_5$ and an organic template material, by a process consisting essentially of combining at least a portion of the Al source and the P source in the absence of the Si source, mixing the resulting mixture with any remaining Al source, the Si source and the organic template material to obtain a gel, and heating the gel to obtain crystallization, wherein the Al and Si sources in the reaction mixture are mixed in the same mole ratios as in the crystalline microporous SAPO-34 which is produced, the P source is added in stoichiometric excess and hydrochloric acid is mixed with and added at the same time as the P source, in a quantity such that the ratio of silica to hydrochloric acid in the gel is kept between 0.3 and 3.

6. Silico-alumino-phosphate according to claim 5, wherein the excess of the P source is present in a quantity corresponding to the amount remaining in the fluid phase after complete crystallization.

7. Silico-alumino-phosphate according to claim 5, wherein the hydrochloric acid is added in a quantity such that the ratio of silica to hydrochloric acid in the gel is kept between 1 and 2.

8. Silico-alumino-phosphate according to claim 5, which exhibits an X-ray powder diffraction pattern characterized by data as given in the following table.

| 2θ | d | 100 × I/I₀ |
|---|---|---|
| 9.49 | 9.32 | 100 |
| 12.80 | 6.92 | 15 |
| 14.07 | 6.29 | 16 |
| 15.98 | 5.55 | 49 |
| 20.54 | 4.33 | 74 |
| 22.27 | 3.991 | 5 |
| 23.06 | 3.857 | 5 |
| 25.26 | 3.526 | 19 |
| 25.80 | 3.453 | 15 |

-continued

| 2θ | d | 100 × I/I₀ |
|---|---|---|
| 27.57 | 3.236 | 4 |
| 28.42 | 3.140 | 3 |
| 29.52 | 3.026 | 5 |
| 30.51 | 2.930 | 25 |
| 31.28 | 2.866 | 17 |

9. In a process for producing olefins from methanol, which comprises contacting the methanol with a catalyst, the improvement wherein the catalyst is the crystalline microporous silico-alumino-phosphate, namely SA PO-34, as recited in claim 5.

* * * * *